C. F. WHIPPLE.

WAGON HOUND AND TONGUE.

No. 7,769. Reissued June 26, 1877.

*Witnesses:*

Theodore Foster.

B. S. Stark

*Inventor:*

Clarence F. Whipple

By Pitch & Pitch

Attys.

N. PETERS, PHOTO-LITHOGRAPHER, WASHINGTON, D. C.

UNITED STATES PATENT OFFICE.

CLARENCE F. WHIPPLE, OF GRAND RAPIDS, WISCONSIN.

IMPROVEMENT IN WAGON HOUNDS AND TONGUES.

Specification forming part of Letters Patent No. 161,648, dated April 6, 1875; reissue No. 7,769, dated June 26, 1877; application filed May 31, 1877.

*To all whom it may concern:*

Be it known that I, CLARENCE F. WHIPPLE, of Grand Rapids, county of Wood, in the State of Wisconsin, have invented certain new and useful Improvements in Wagons, of which the following is a specification, reference being had to the accompanying drawings, forming part hereof.

My invention relates to a wagon in which the draw-bar has an independent lateral movement on the tongue and a longitudinal movement with the tongue, whereby the draft on the horses is equalized independent of any movement laterally of the tongue, and avoiding the necessity of, or liability to, such side movement; and it relates, also, to the construction and arrangement of the hounds of the tongue and wagon whereby the tongue is prevented from switching, and whereby the wagon may be braced against the tongue and guided thereby in going down hill or in backing the team, as hereinafter described, and recited in the claims.

Figure 1:
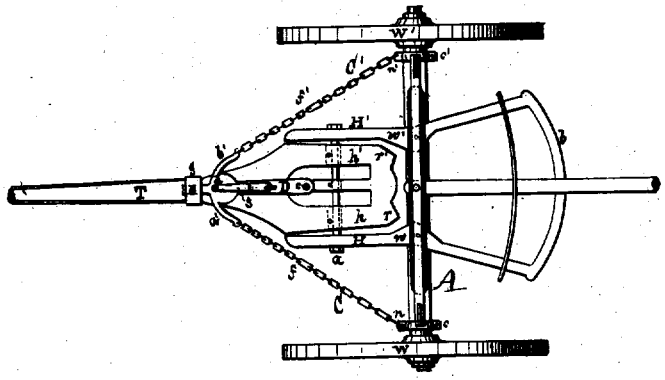
Figure 3:
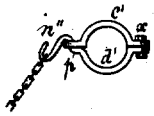
Figure 2:
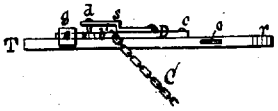

Figure 1 is a plan of the front part of a wagon embodying my invention. Fig. 2 is a side view of a portion of the wagon-tongue, showing the draw-bar thereon, and Fig. 3 is a similar view of the peculiar device by which I attach the draft-chains to the axle.

A is the front axle. W and W′ are the front wheels. H and H′ are the large hounds, formed as shown in the drawings, projecting forward at right angles from the axle-tree A and parallel to each other, with the curved cross-bar *b* joining their rear ends, and having the bevels or wedges *w w′* formed or secured upon their inner sides, immediately in front of the line of the axle, as shown. T is the tongue, formed with or carrying the small hounds *h* and *h′*, which are made with their outer sides inclined somewhat toward each other from front to rear, and with the beveled ends *r r′*, as shown. The small hounds are attached to the large hounds by the bolt *a*, as shown. D is the draw-bar, which has a lateral movement, independently, on the tongue, and without any accompanying lateral movement of the tongue, and longitudinal movement with the tongue. As a means of giving the lateral movement to the draw-bar, the draw-bar is pivoted upon the tongue at *c*, while, as a means of giving to the draw-bar the longitudinal movement, the opening through which the bolt *a* passes in the small hounds of the tongue is slotted, as shown. Thus it is evident that the draw-bar may swing laterally upon its pivot independently of the tongue, and without causing any similar swinging or lateral movement of the tongue, and will move longitudinally with the tongue. The hammer-strap *s* is attached in the usual manner to the draw-bar, as shown, with the bolt *d*, to which the evener is to be attached, passing through the hammer-strap and draw-bar, but not through or into the body of the tongue. The forward end *e* of the draw-bar may be elongated, and permitted to work in a guide plate or strap, *g*, on the tongue, if desired. The draw-bar is provided with arms *a′* and *b′*, one upon either side, to which the draw-chains C and C′ are attached at their forward ends. The draw-chains C and C′ are provided with screw-swivels *f* and *f**, and are attached to the axle A on either side by means of bands *c′* and *d′*, secured upon the axle, which are provided with hooks *n* and *n′*, as shown. The bands *c′* and *d′* are formed and secured to the axle, as shown in Fig. 3, the band *c′* passing around over the axle, and having a lug or tongue piece, *p*, with an opening in it, projecting forward from the axle, and the band *d′* passing around the axle and up through the opening in the lug or tongue-piece *p*, thus forming a hinge-joint in the two bands, which are then bolted together on the rear side of the axle, as shown. The end of the band *d′* is formed into a hook, *n*, to which the draw-chain C is attached. The hooks *n* and *n′* are inclined inward at an angle to the axle, so that they may be in a line with the draw-chains to receive the draft.

Now, it is evident that the draft of the team is entirely upon the draw-bar D and the draw-chains attached to the front axle, and not upon the tongue or the large hounds, and that the draw-bar having a free lateral swing or movement on the tongue and entirely independent of the tongue, and in such manner that the tongue is not influenced or swung laterally by the swinging of the draw-bar, and having the described longitudinal movement. the draft upon the team is equalized at all times. By means of this independently-swinging draw-bar, having its lateral movement independent of the tongue, all switching of the tongue is prevented. It is also evident that in going down hill, or in backing the team, the small hounds will play backward between the large hounds, and, by means of the beveled ends *r* *r'* of the small hounds bearing against the wedges *w* and *w'* on the large hounds, the forward wheels will be firmly and rigidly braced against the tongue, and the wagon thus readily guided and controlled in its course. It is also evident that by means of the screw-swivels *f* and *f'* the draw-chains may be lengthened or shortened, as may be desired. It is also evident that, by means of the hooks *n* and *n'*, the draw-chains may be readily and conveniently attached to the axle. And it is also evident that, by means of the hinge-joint formed by the hooked end of the band *d'* passing through an opening in the lug *p* on the band *c'*, the said bands may be readily clasped upon and bolted in place upon the axle, as shown in Fig. 3.

I am aware that the combination of curved or beveled hounds carried by the tongue, with slotted hounds on the axle, is not new, and I do not intend to claim such combination of devices hereunder. I am also aware that the combination of a draw-bar with the tongue by means of devices which permit a longitudinal movement of the draw-bar independent of the tongue, but which prevent any lateral movement of the draw-bar independently of the tongue, and which compel the draw-bar and tongue to have a simultaneous and similar lateral movement, is now in use, in connection with other devices. I do not wish to claim such devices thus combined and operating in the manner cited. I desire to be understood to claim hereunder only the specific invention shown and set forth, which is the combination, in a wagon-draft, of the draw-bar having a free lateral movement on the tongue, and entirely independent in such movement of the tongue, and having a longitudinal movement with the tongue, in connection with the other necessary parts of the draft.

What I claim as my invention, and desire to secure by Letters Patent, is—

1. In a wagon-draft, the draw-bar D, having a free lateral movement on the tongue, and independent of the tongue, and a longitudinal movement with the tongue, as and for the purpose specified.

2. In a wagon, the combination of the tongue T, the slotted hounds *h* *h'* with their beveled ends *r* and *r'*, the large hounds H and H' with their wedges *w* and *w'*, the pin *a*, the pivoted draw-bar D, the chains C C', and the hooks *n* *n'* on the axle A, as and for the purpose specified.

3. The combination of the band *c'* with its lug *p*, having an opening in it, through which passes the hooked end *n''* of the band *d'*, forming a hinged joint, the bolt *x*, and the axle A and draw-chain C, as described.

CLARENCE F. WHIPPLE.

Witnesses:
E. E. WHIPPLE,
LAURENCE QUINN.